United States Patent Office 3,007,421
Patented Nov. 7, 1961

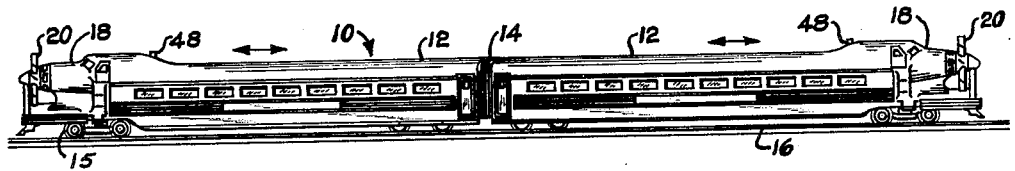
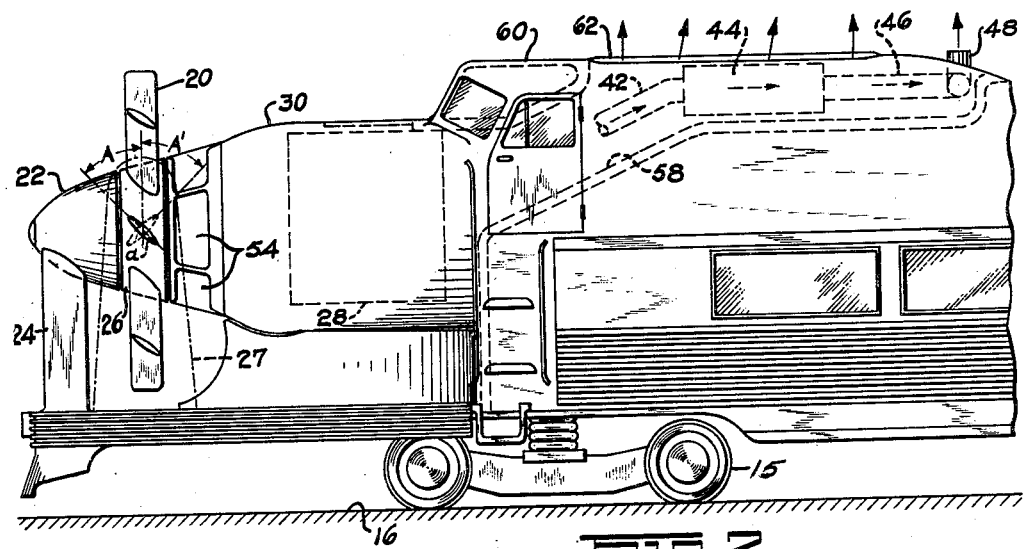
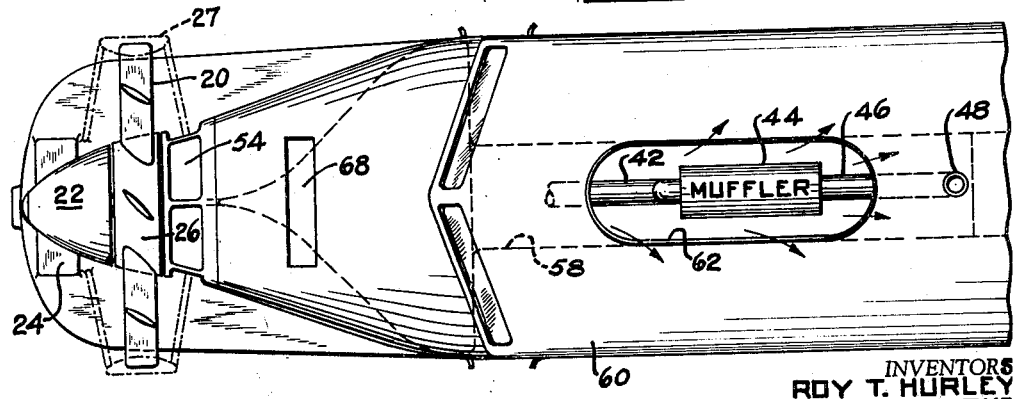

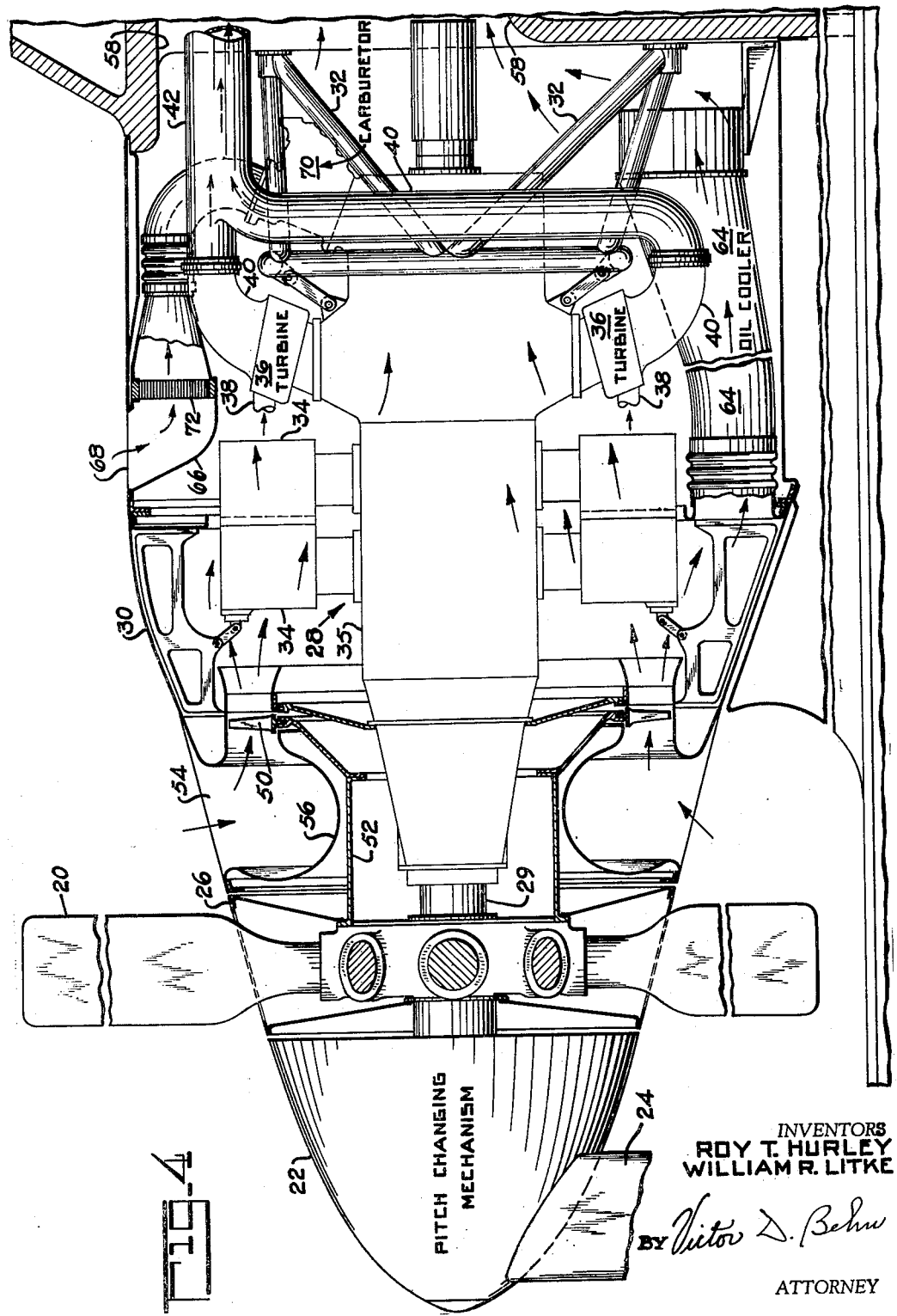

3,007,421
PROPELLER DRIVEN RAILWAY VEHICLE
Roy T. Hurley, Saddle River, and William R. Litke, Franklin Lakes, N.J., assignors to Curtiss-Wright Corporation, a corporation of Delaware
Filed Dec. 22, 1958, Ser. No. 782,062
3 Claims. (Cl. 105—66)

This invention relates to railway vehicles and is particularly directed to a rail vehicle in which propulsion is provided by two power plants each including a combustion engine and a bladed aircraft-type air propeller driven thereby, there being one such power plant at each end of the rail vehicle.

For the purpose of this invention a "rail vehicle" is a vehicle designed for motion along railway tracks and may comprise either a plurality of car sections articulately connected together or only a single car.

An object of the present invention comprises the provision of a novel rail vehicle propulsion system in which said rail vehicle is propelled by a power plant at each end of the vehicle, the one pushing and the other pulling to propel the vehicle.

A still further object of the invention resides in the use of a novel internal combustion engine and air propeller power plant at each end of a rail vehicle, the direction of thrust of each power plant being reversible simply by reversing the pitch angle of the propeller blades and each power plant being capable of substantially the same performance and efficiency in either direction of travel.

Other objects of the invention will become apparent upon reading the annexed detailed description in connection with the drawing in which:

FIG. 1 is a side elevation of a rail vehicle embodying the invention;

FIG. 2 is an enlarged view of either power plant end of the rail vehicle of FIG. 1;

FIG. 3 is a top view of FIG. 2; and

FIG. 4 is a further enlarged schematic view of a portion of FIG. 2.

Referring first to FIGS. 1-3 of the drawing, reference numeral 10 designates a rail vehicle which, as illustrated, comprises two rigid car sections 12 having an articulated connection at 14. The rail vehicle has wheels 15 designed for travel along conventional railway tracks 16. An aircraft-type internal combustion engine power plant 18 is provided at one end of the rail vehicle and a substantially identical but oppositely facing power plant 18 is provided at the other end of said rail vehicle.

Each power plant 18 includes an aircraft-type bladed propeller 20 drivably connected to an internal combustion engine 28, said propeller being at the end of the engine remote from its end of the rail vehicle. As is conventional in aircraft propellers, each propeller 20 includes mechanism 22 for progressively rotating its blades about their longitudinal axes so as to vary the pitch angle of said blades both in magnitude and direction from the plane of propeller rotation. Such pitch changing mechanism is well known in the aircraft propeller art. The pitch changing mechanism 22 for each propeller 20 has a fixed housing which forms a streamlined nose piece for the propeller and is supported from the adjacent end of the rail vehicle by a pedestal 24. Also the propeller 20 has a spinner member 26 forming a streamlined continuation of the nose piece 22 and through which the individual blades of the propeller extend. A suitable protective guard 27 (FIGS. 1 and 2) may be disposed about each propeller to prevent injury to persons standing close to the propeller.

Each propeller 20 differs from a conventional aircraft propeller in that its blades have the same pitch angle throughout their working length, that is from the propeller spinner 26 to the outer tip of the blade. The mean line of the profile of each transverse blade section is straight as indicated by line a FIG. 2. In addition the profile of each transverse section of a propeller blade is symmetrical about its mean line with each face of the blade being slightly convex. With this construction the working portion of each blade has a substantially flat paddle-like shape whereby its aerodynamic characteristics are substantially the same in reverse as in forward pitch. FIG. 2 also illustrates the pitch angle A for one of the propeller blades and in addition the same blade is illustrated by dashed lines in a position of reverse pitch angle A' of approximately the same magnitude as A but reversed in direction from the plane of propeller rotation.

When the rail vehicle 10 is, for example, traveling to the right in FIG. 1, the left propeller 20 pushes and the other pulls. Propulsion in the opposite direction is effected by reversing the pitch angle of the blades of both propellers. If the rail vehicle 10 is sufficiently long the slip stream from the forward propeller will be small by the time it reaches the rear propeller. Such being the case, then for a particular speed and direction of propeller rotation and for a pitch angle of approximately the same magnitude but reversed in direction, the propeller thrust is substantially the same whether it is pulling or pushing.

Compared to aircraft propeller blades, the length of the blades of each propeller 20 is quite small in relation to the diameter of their spinner member 26. For this reason the propeller efficiency loss resulting from the symmetrical flat construction of its blades is low. On the other hand, however, by simply reversing the pitch angle of the blades of a propeller 20 substantially equal thrust is obtained from said propeller in the opposite direction.

Each power plant 18 also includes an engine 28 drivably connected to its propeller by a shaft 29. Each engine 28 is mounted within a cowl 30 which forms a smooth continuation of its associated propeller spinner 26. Struts 32 serve to support one end of the engine from the adjacent end of the rail vehicle. The engine 28 preferably is an aircraft-type, radial-cylinder aircooled internal combustion engine so that maximum power is obtainable with minimum weight.

As illustrated, the engine 28 is similar to the engine disclosed in Patent No. 2,607,189 to A. Chilton. As such, the engine has two banks of circumferentially-spaced cylinders 34 mounted on and extending radially from the engine crankcase 35. In addition, the engine includes a plurality of exhaust driven turbine units 36 which are drivably connected to the engine crankshaft. Each turbine unit 36 is supplied with exhaust gases from several of the engine cylinders through cylinder exhaust pipes such as 38. For a more detailed description of such an internal combustion engine 28 reference is made to the aforementioned Chilton patent.

In the engine 28, the exhaust gases from the turbine units 36 discharge through pipes 40 into a common discharge pipe or duct 42. From the pipe 42 the exhaust gases discharge through noise muffler 44 and thence through a discharge pipe or duct 46 having a vertical discharge end 48 opening into the surrounding atmosphere.

As noted, each engine 28 is an air cooled engine. As such the engine cylinders 34 and their cylinder heads are provided with the usual heat radiating fins (not shown) for flow of cooling air thereover. In order to supply the engine 28 with cooling air, a fan 50 is mounted within its engine cowl 30 between the engine cylinders 34 and the propeller 20 driven by said engine. As indicated by the connection 52 the fan 50 is drivably connected to the propeller 20 for rotation therewith by the engine 28.

The cowl 30 for each engine 28 has a substantially annular air inlet opening 54 at its surface for its associated fan 50 and an annular duct 56 supplies air from said inlet opening to the blades of the fan 50. The fan 50 blows cooling air over the engine cylinders 34 and associated cylinder heads. After passing over the engine cylinders and cylinder heads, the engine cooling air is collected in a discharge duct 58 which extends into and through an engineer's cab 60 immediately adjacent to its engine 28. Said cooling air discharge duct 58 has a discharge opening 62 which is substantially flush with the upper surface of said cab 60.

A portion of the cooling air supplied by the fan 50 may pass through an oil cooler schematically indicated at 64 for cooling the engine oil. This oil cooler air may as illustrated, also discharge through the discharge duct 58.

The engine exhaust pipe 42 and muffler 44 preferably are disposed in the engine cooling air duct 58 whereby said cooling air also serves to cool the engine exhaust passages.

Air for combustion in each engine 28 is supplied by a duct 66 having an inlet opening 68 flush with the surface of the engine cowl 30. This air is supplied to the engine through its carburetor 70. A suitable filter 72 may be provided in the engine air inlet duct 66 of each engine. Suitable screens, not shown, may be provided over the opening 68 as well as over the cooling air inlet opening 54.

With the aforedescribed structure of each engine 28, the inlet opening 54 of its engine cooling air duct 56 and the inlet opening 68 of the engine inlet air duct 66 for engine combustion air both open into the surrounding atmosphere in a direction which is substantially at right angles to the path of travel of the rail vehicle. Likewise the outlet opening 62 for the engine cooling air duct 58 and the outlet opening 48 of the engine exhaust duct 48 both open into the surrounding atmosphere in a direction which is substantially at right angles to the rail vehicle path of travel. It is apparent therefore that the performance of each engine 28 is not influenced by the direction of travel of the rail vehicle.

It is intended that the rail vehicle 10 be propelled simultaneously by both power plants 18 in both directions of travel of the vehicle. For example, if the vehicle is to travel to the left (FIG. 1) the propeller blade pitch angle of both power plants is set for propulsion to the left whereupon the left power plant pulls and the right power plant pushes. For propulsion to the right it is only necessary to reverse the pitch of the propeller blades of both power plants to the desired magnitude of pitch angle. As is common in the case of aircraft engines the rotative speed of each engine may be governed by varying the magnitude of pitch angle of its propeller blades. With the construction described equal power plant performance, of both propeller and engine, can be obtained from each power plant in both directions of travel. Also forward motion of the rail vehicle in either direction can be braked by reversing the pitch angle of the propeller blades.

Duplicate controls for each power plant 18 may be provided in each engineer's cab 60 so that both power plants may always be controlled from the forward cab 60 regardless of the direction of travel of the vehicle 10.

While we have described our invention in detail in its present preferred embodiment it will be obvious to those skilled in the art after understanding our invention that various changes and modifications may be made therein without departing from the spirit or scope thereof.

We claim as our invention:

1. In combination with a rail vehicle; two substantially similar power plants mounted on said vehicle, one at each end of said vehicle with said power plants facing in opposite directions along the path of travel of the vehicle; each said power plant comprising a combustion engine and a bladed air propeller drivably connected to said engine; each power plant propeller including means for reversing the pitch angle of the propeller blades and said propeller blades each having a substantially flat paddle-like working portion; and each power plant having a duct for supplying the engine with air for cooling the engine, a duct for supplying the engine with air for combustion therein, a duct for the discharge of said cooling air, and a duct for the discharge of the engine exhaust gases, each said supply duct having its inlet end opening and each said discharge duct having its outlet end opening directed substantially at right angles to the direction of said path of vehicle travel.

2. The combination recited in claim 1 in which each engine is an air-cooled radial cylinder engine and each power plant includes a cooling air fan drivably connected to its engine, each said fan having blades disposed in and between the ends of the cooling air flow path of its associated engine for causing air flow therethrough.

3. The combination recited in claim 1 in which the cooling air discharge duct of each engine surrounds a substantial portion of the engine exhaust gas discharge duct for cooling air flow thereover and in which each said engine exhaust duct portion includes an exhaust noise muffler.

References Cited in the file of this patent

UNITED STATES PATENTS

| | | |
|---|---|---|
| 470,534 | Anderson | Mar. 8, 1892 |
| 1,051,093 | Fawkes | Jan. 21, 1913 |
| 1,637,776 | Kruckenberg et al. | Aug. 2, 1927 |
| 1,685,035 | Robertson | Sept. 18, 1928 |
| 2,613,752 | Hawkins | Oct. 14, 1952 |
| 2,619,918 | Hughes | Dec. 2, 1952 |
| 2,864,318 | Toulmin | Dec. 16, 1958 |

FOREIGN PATENTS

| | | |
|---|---|---|
| 359,883 | Great Britain | Oct. 29, 1931 |